Aug. 13, 1968     C. A. KROENING     3,396,988
CHAIN AND SPROCKET ASSEMBLY
Filed Dec. 8, 1966

INVENTOR
CHARLES A. KROENING
BY
ATTORNEYS

United States Patent Office 3,396,988
Patented Aug. 13, 1968

3,396,988
CHAIN AND SPROCKET ASSEMBLY
Charles A. Kroening, R.R. 1, Box 143,
Fountaintown, Ind. 46130
Filed Dec. 8, 1966, Ser. No. 600,127
7 Claims. (Cl. 280—96)

ABSTRACT OF THE DISCLOSURE

A chain and sprocket assembly for reducing the play in a driver shaft in which said driver shaft and its driven shaft carry pluralities of pairs of aligned sprockets interconnected by a plurality of chains. Two pairs of said sprockets are eccentrically mounted on their respective shafts, with one of said two pairs being offset in one direction from the shaft axes and the other of said two pairs being offset in an opposite direction from the shaft axes.

---

This invention relates to a chain and sprocket assembly, and more particularly to such an assembly adapted to transmit a driving force to a driven member.

It is an object of the invention to provide a chain and sprocket assembly which is substantially free of delay in its reaction time, which will provide but a small amount of play in the driver member, which can be employed in a vehicular steering apparatus, and which will enhance the safety of such a steering apparatus.

In accordance with one form of the invention, as it is embodied in a vehicular steering apparatus, the gear box for the steering linkage and the steering column shaft are offset from each other so that any impact force on the wheels at the front of the vehicle will not be transmitted directly to the steering column and thus toward the driver. The steering column shaft is connected to a driver shaft and the gear box to a driven shaft. Each of said driver and driven shafts carries three sprockets aligned with the sprockets on the other shaft to thus provide three pairs of sprockets with each of said pairs interconnected by a chain. The sprockets constituting one pair are mounted axially on their respective shafts, but the remaining pairs of sprockets are mounted eccentrically on their shafts, one pair being offset in one direction with respect to the shaft axes and the other pair offset in an opposite direction with respect to the shaft axes.

When the assembly is in a quiescent state, each of the three chains will have a certain amount of slack and sag. However, because of the sprocket mounting, upon rotation of the driver shaft, the radial distance between the driver shaft axis and the chain-sprocket juncture on one of the sprockets eccentrically mounted on said driver shaft will increase at a faster rate than the radial distance between said axis and the chain-sprocket juncture on the axially mounted shaft. Therefore, said eccentrically mounted sprocket will quickly take up the slack in its chain and cause its associated sprocket on the driven shaft to start rotating said driven shaft. When said eccentrically mounted sprocket has reached the point in the rotation where the radial distance between the driver shaft axis and its juncture with its chain starts to decrease, said radial distance will start to increase on the other eccentrially mounted sprocket so that the rotation of the driven shaft will continue in a uniform manner.

Other objects and features of the invention will become apparent from the more detailed description which follows and from the accompanying drawing in which.

Figure 1:
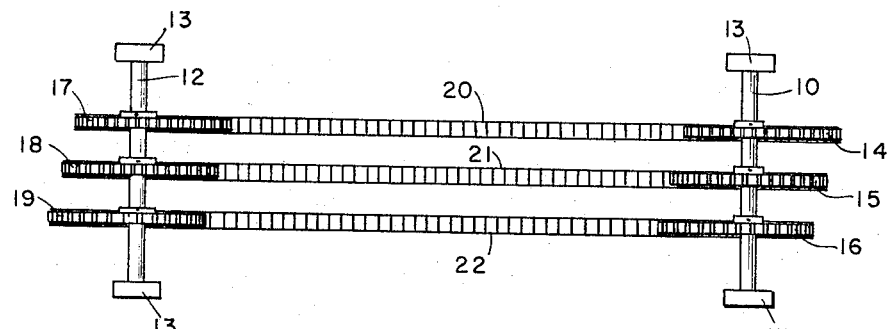
FIG. 1 is a plan view of a chain and sprocket assembly embodying the invention.

As shown, my chain and sprocket assembly comprises a driver shaft 10 adapted to drive a parallel driven shaft 12, said shafts being rotatably supported in journal mounts 13. To this end, three sprockets 14, 15, and 16 are mounted on shaft 10 in alignment wtih three sprockets 17, 18, and 19, respectively, on shaft 12, thereby forming sprocket pairs 14 and 17, 15 and 18, and 16 and 19. All of the sprockets have the same diameters and the same number of teeth. The pair of sprockets 15 and 18 are mounted axially on shafts 10 and 12, but the other two pairs of sprockets 14 and 17 and 16 and 19 are mounted eccentrically on said shafts in opposite directions from each other. Thus, with the assembly in the position shown in FIG. 2, the sprockets 16 and 19 are offset to the left of the axes of shafts 10 and 12, and the sprockets 14 and 17 are offset by the same distance to the right of the shaft axes. The sprockets 14 and 17 are connected by a chain 20, the sprockets 15 and 18 by a chain 21, and the sprockets 16 and 19 by a chain 22.

Figure 2:
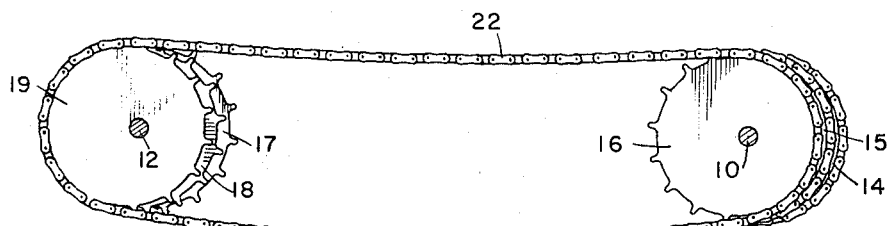
FIG. 2 is an elevational view of the chain and sprocket assembly shown in FIG. 1.

With the assembly in the position shown in FIG. 2, if the shaft 10 is rotated in either direction, the radial distance between the axis of said shaft and the juncture of sprocket 16 and chain 22 will increase, the radial distance between said shaft axis and the juncture of sprocket 15 and chain 21 will remain constant, and the radial distance between said shaft axis and the juncture between sprocket 14 and chain 20 will decrease. The rate of increase in such radial distance on sprocket 16 will be equal to the rate of decrease on sprocket 14 since said sprockets are equally offset in opposite directions with respect to shaft 10. Thus, with the radial distance increasing on sprocket 16 the circumferential speed of the portion of sprocket coming into mesh with chain 22 will increase causing it to remove the slack from said chain and rotate sprocket 19 to drive shaft 12. Since the circumferential speed of the portion of sprocket 14 coming into mesh with chain 20 will be decreasing at the same rate, the constant circumferential speed of the portion of sprocket 15 coming into mesh with chain 21 will cause sprocket 15 to remove the sag from chain 21 and impart a driving force to sprocket 18 as the circumferential speed of the portion of sprocket 16 decreases less than the speed of said portion of sprocket 15. When the circumferential speed of the portion of sprocket 14 coming into mesh with chain 20 increases to a speed greater than the speed of said portion of sprocket 15, sprocket 14 will remove the slack from chain 20 and drive sprocket 17. Thus, whenever any driving force is transmitted to shaft 10 it will be transmitted substantially immediately to shaft 11 without any play in shaft 10.

As has been described, the circumferential speeds of the portions of sprockets 14 and 16 coming into engagement with chains 20 and 22 change inversely with respect to each other so that when one portion slows down the other speeds up to impart a driving force to shaft 12. Thus, sprocket 15 serves to equalize and smooth out this transition in the change of speed between the portions of sprockets 14 and 16 coming into contact with their chains, and if such a smooth transition is not desired or required, sprockets 15 and 18 can be omitted from the assembly.

Figure 3:
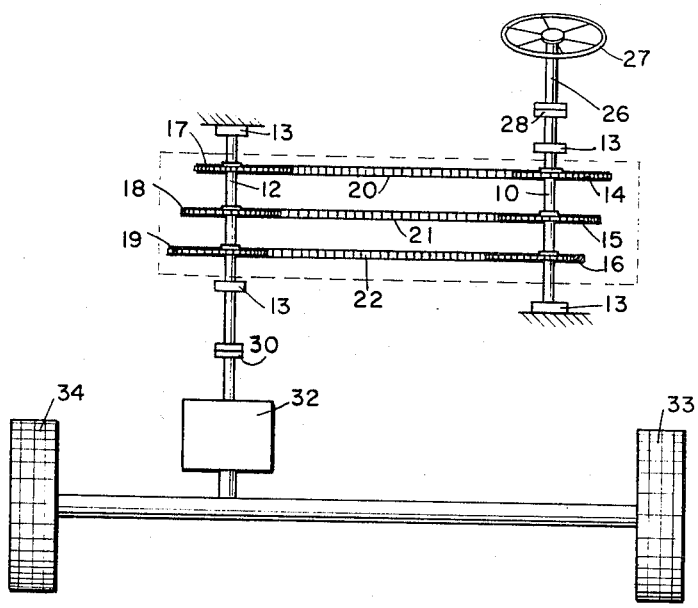
FIG. 3 is a plan view of the chain and sprocket assembly shown in FIG. 1, but showing said assembly embodied in a vehicular steering apparatus.

As shown in FIG. 3, the chain and sprocket assembly can be embodied in a vehicular steering system. In such system, the steering wheel shaft 26 having wheel 27 mounted thereupon is connected through a conventional coupling 28 to shaft 10. Shaft 12 is connected through a conventional coupling 30 to a gear box 32. The gear box is in turn interconnected to the turning wheels 33 and 34 in a conventional manner.

It is thus seen any shock or impact force to the wheels 33 and 34, or to gear box 32, will not result in a shock to the steering shaft 26 since there is no rigid driving connection between shafts 10 and 12. The offset arrangement of the sprockets will cause the steering response imparted to the wheels 33 and 34 upon rotation of shaft 26 to be substantially immediate thereby reducing the play in the steering wheel 27. And since the shafts 10 and 12 are interconnected by three chains, the failure of any two of said chains will not prevent shaft 10 from still imparting a rotational movement to shaft 12.

I claim:

1. A chain and sprocket assembly, comprising a driver shaft and a driven shaft, pairs of aligned sprockets mounted on said shafts, a first pair of said sprockets being eccentrically mounted on said shafts and offset in the same direction from the shaft axes, a second pair of said sprockets being eccentrically mounted on said shafts and offset in the same direction from the shaft axes by a distance equal to the distance at which said first pair of sprockets are offset from said shaft axes, said first and second pairs of sprockets being offset in opposite directions from said shaft axes, and a plurality of chains interconnecting the sprockets in said pairs of sprockets.

2. The invention as set forth in claim 1 in which said sprockets have the same diameters.

3. The invention as set forth in claim 1 with the addition that a third pair of sprockets are mounted axially on said shafts and are interconnected by a chain.

4. In a vehicular steering apparatus, steering control means operatively interconnected to a driver shaft for rotating said driver shaft, a rotatable driven shaft, means operatively interconnecting said driven shaft to steerable ground-engaging means, pairs of aligned sprockets mounted on said shafts, a first pair of said sprockets being eccentrically mounted on said shafts and offset in the same direction from the shaft axes, a second pair of said sprockets being eccentrically mounted on said shafts and offset in the same direction from the shaft axes by a distance equal to the distance at which said first pair of sprockets are offset from said shaft axes, said first and second pairs of sprockets being offset in opposite directions from said shaft axes, and a plurality of chains interconnecting the sprockets in said pairs of sprockets.

5. The invention as set forth in claim 4 in which said sprockets have the same diameters.

6. The invention as set forth in claim 4 with the addition that a third pair of sprockets are mounted axially on said shafts and are interconnected by a chain.

7. The invention as set forth in claim 4 in which said shafts are disposed in parallel spaced relation to each other.

References Cited

UNITED STATES PATENTS

| | | | |
|---|---|---|---|
| 794,716 | 7/1905 | Kimble | 280—96 |
| 935,610 | 9/1909 | Mauksch | 280—93 |
| 954,789 | 4/1910 | Edison | 74—216.5 |
| 1,117,419 | 11/1914 | Miller | 280—93 |
| 2,842,376 | 7/1958 | Krilanovich | 280—91 |

FRED C. MATTERN, Jr., *Primary Examiner.*

J. A. WONG, *Assistant Examiner.*